United States Patent
Wills

[15] 3,656,296
[45] Apr. 18, 1972

[54] FLUID PRESSURE INTENSIFIER
[72] Inventor: Donald F. Wills, Suffield, Conn.
[73] Assignee: Pilot Research Corporation, Valdese, N.C.
[22] Filed: June 12, 1969
[21] Appl. No.: 832,794

[52] U.S. Cl. ............................................. 60/26.1
[51] Int. Cl. ...................................... F01b 29/08
[58] Field of Search .................................... 60/26.1

[56] References Cited

UNITED STATES PATENTS

| | | | |
|---|---|---|---|
| 3,067,574 | 12/1962 | Corbett | 60/35.6 |
| 2,815,008 | 12/1957 | Hirt | 60/26.1 |
| 3,031,845 | 5/1962 | Ludwig | 60/26.1 |
| 3,034,289 | 5/1962 | Stott et al. | 60/26.1 |
| 3,483,695 | 12/1969 | Olsen | 60/26.1 |

Primary Examiner—Wendell E. Burns
Attorney—Radford W. Luther

[57] ABSTRACT

A plunger containing a frangible section is secured in a pressure vessel, dividing the vessel into a first and a second compartment. The first compartment contains a compressed gas, and the second compartment contains a solid gas charge to exert a pressure on the plunger and break the frangible section, thus releasing the plunger for axial sliding movement in the vessel to further compress the gas. The plunger is made of a thermally conductive material allowing the heat energy in a second compartment to pass into the first compartment energizing the compressed gas.

10 Claims, 2 Drawing Figures

PATENTED APR 18 1972 3,656,296

INVENTOR
DONALD F. WILLS
BY Rodford W. Luther
ATTORNEY

FLUID PRESSURE INTENSIFIER

BACKGROUND OF THE INVENTION

This invention pertains to control systems which derive their source of motive power from a source of compressed gas. More particularly, this invention pertains to missile flight control systems which require fluid energy under very cold conditions.

This invention further pertains to control systems which expand compressed gas through pressure regulators to achieve a desirable working pressure at the time of usage. This invention also relates to systems where working regulated pressure is relatively high with respect to stored pressure, causing a great deal of energy to remain in the storage vessel.

This invention further relates to systems where addition of heat to the working fluid is necessitated to minimize system weight and volume.

Missile flight control systems frequently employ a compressed elastic fluid as a source of motive power to actuate aerodynamic fins. Very cold operating conditions require more stored fluid than would be required under hot operating conditions since cold fluid possesses less useful energy than hot fluid. Many of these systems employ a pressure vessel for storage of a working fluid in which a pressure threshold exists, below which useful work cannot be accomplished. One approach, in the prior art, to the above enumerated difficulties has included the use of larger pressure vessels. Unfortunately, the consequential weight and volume increase has proscribed their use in many applications.

SUMMARY OF THE INVENTION

A pressure vessel is divided into two compartments by a plunger with a thermally conductive movable wall therebetween. The controlled burning of a solid fuel charge in one compartment results in a temperature and pressure increase therein. The temperature increase causes a heat flow through the wall to the other compartment to heat a compressed working gas contained therein. The plunger is adapted to commence movement upon a predetermined pressure differential being applied thereto, to reduce the residual volume in the compartment containing the compressed gas and heat the gas by compression in order to occasion an increased efficiency of fluid utilization.

A primary object of this invention is to provide a means for more efficient energy utilization of a cold gas supply.

A particular object of this invention is to provide a pressure vessel containing a compressed gas in which the residual volume of the compressed gas is automatically decreased by use of a solid fuel charge.

A further object of this invention is to provide a pressure vessel in which the stored fluid is simultaneously compressed and warmed by a thermally conductive movable wall.

A still further object of this invention is to provide a pressure vessel containing a compressed gas in which the residual volume is reduced while simultaneously increasing the temperature of the gas by heat transfer across a moving wall and compression of the gas by the wall.

Other objects, features and advantages of the present invention will be more fully apparent to those skilled in the art from the following detailed description taken in connection with the accompanying drawings.

DESCRIPTION OF THE PREFERRED EMBODIMENT

Figure 1:
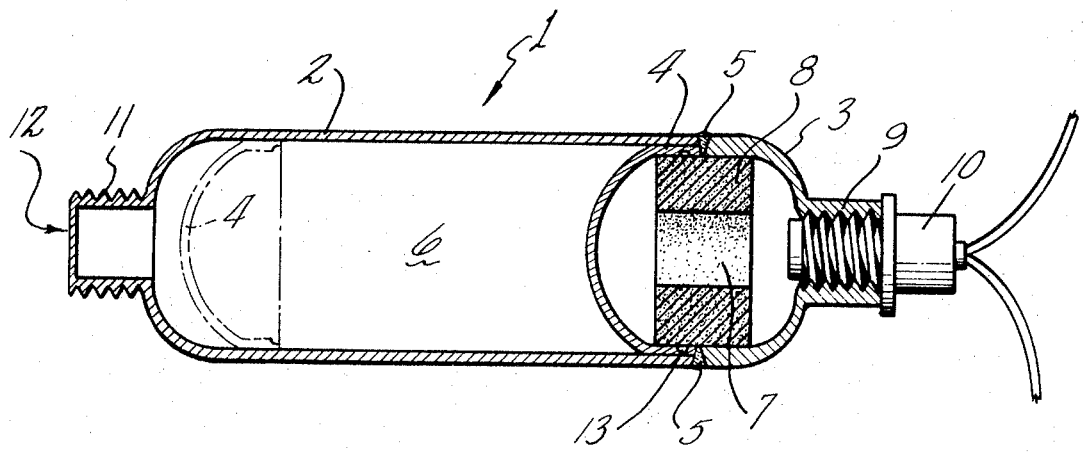
FIG. 1 is a cross-sectional view of a pressure vessel in accordance with the invention.

There is shown generally at 1 in FIG. 1 a cylindrical pressure vessel according to the invention. Within the outer casings 2 and 3 of pressure vessel 1, a generally cylindrical chamber is defined which contains a drive means such as piston element or plunger 4, the periphery of which is circumferentially contiguous to the inner surface of outer casing 2. Plunger 4 is cup-shaped and has a concave inner surface and convex outer surface which define a wall thickness which is small compared to the diameter of the chamber. Plunger 4 is restrained from sliding axial movement within outer casing 2 by circumferential seal weld 5 which also sealingly interconnects outer casings 2 and 3 forming an integral vessel structure.

The plunger 4 divides pressure vessel 1 into two distinct compartments 6 and 7, and is made of a thermally conductive material so that the transfer of heat energy from compartment 7 to 6 will be facilitated across the thin wall thereof. It will be noted that the somewhat spherical shape of the plunger's wall permits a minimum wall thickness, while maximizing heat transfer area. Compartment 6 contains a compressed working fluid such as nitrogen gas under a pressure of from 5,000 to 7,000 PSI adapted to supply a fluid actuator, motor, thrust control system, or other fluid using device. Compartment 7 contains an annular solid fuel charge 8 suitably secured to the inner surfaces of outer casing 3 and plunger 4, and an appropriate gas (such as air) to support the combustion of the fuel charge.

The end of vessel 1, adjacent compartment 7, is provided with a threaded cylindrical opening 9 in which an igniter 10 is threadingly mounted in open communication with compartment 7 to ignite solid fuel charge 8.

At the end of vessel 1, adjacent compartment 6, is a cylindrical threaded opening 11 and a diaphragm member 12 sealingly secured to the outlet end thereof to generally maintain the pressure under static conditions (i.e., when the plunger is at rest). Opening 11 is adapted to have an actuating device, such as an explosive cutter, (not shown) secured thereto for rupturing diaphragm 12. The actuating device may include a conduit for communicating the gas in compartment 6 to a using device.

Figure 2:
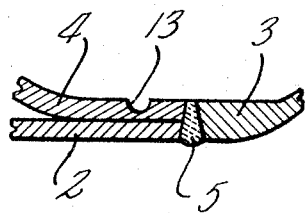
FIG. 2 is an enlarged view of the area shown in FIG. 1 where the plunger of the invention abuts the wall of the pressure vessel.

Turning now to the structural relationship between the plunger 4 and outer casings 2 and 3, as best shown in FIG. 2, plunger 4 is shown fixedly secured to the outer casings 2 and 3 by a seal weld 5, which restrains axial sliding movement of the plunger within casing 2. The inner surface of the wall of plunger 4 embodies a frangible annular recess or reduced section 13, which is designed to fail upon imposition of a predetermined pressure differential on the exposed surfaces of plunger 4. The purpose of this frangible wall is to prevent movement of plunger 4 until the pressure in compartment 7 is above the pressure in compartment 6 by some preselected amount. It should be noted that the design configuration of plunger 4 could be varied to provide additional heat transfer surface area exposed to the gas in compartment 6. For example, plunger 4 could assume a somewhat conical configuration.

In operation, the pressure vessel 1 is initially filled with a gas, such as nitrogen, to a pressure of from 5,000 to 7,000 PSI. On activation, seal diaphragm 12 is punctured by a suitable means establishing a flow of gas from opening 11 to a gas using device, such as an actuator. Sometime later, the igniter is activated initiating the burning of solid fuel charge 8. The reason for igniting charge 8 subsequent to the puncturing of diaphragm 12 is to avoid excessive pressure in compartment 6. When the burning charge has created a sufficient pressure differential across the plunger, the wall of the plunger will break because of an excessive tensile stress therein at the annular recess causing movement of the plunger toward the outlet opening 11, resulting in the heating of the gas by compression. The gas will be further heated by the burning charge as a consequence of the plunger's thermally conductive wall. The increment in the energy of the gas is hence attributable to both the compression by the plunger and heat transfer across the plunger.

As the plunger moves toward the outlet opening 12, the residual volume in compartment 6 is thereby reduced. As a reduction of the residual volume of a fluid system increases the efficiency thereof, the movement of plunger 4 in compartment 6 will result in an increased efficiency of fluid utilization. The final position of plunger 4 is shown in phantom in FIG. 1, wherein the gas supply is essentially exhausted.

While a particular exemplary preferred embodiment of the invention has been described in detail above, it will be understood that modifications and variations therein may be effected without departing from the scope and spirit of the novel concepts of the present invention.

I claim as my invention:

1. Apparatus for efficient utilization of a compressed gas supply comprising a pressure vessel having a generally cylindrical sealed chamber therein, a cup-shaped plunger contained within said chamber dividing the chamber into a first compartment and a second compartment and forming a seal therebetween, said first compartment containing a compressed working gas under high pressure, said first compartment having an outlet, means to seal said outlet to generally maintain said high pressure under static conditions, the peripheral wall of said plunger having an annular reduced section designed to fail upon the imposition of a predetermined stress, means to fixedly secure said plunger to said vessel, means to increase the temperature and pressure in said second compartment for imposing a pressure differential across said plunger sufficient to cause failure of said reduced section, whereby upon failure of said reduced section said plunger may move within said chamber to reduce the volume of said first compartment.

2. Apparatus according to claim 1, wherein said pressure vessel comprises means to release said compressed working gas to a gas using device.

3. Apparatus according to claim 1, wherein said pressure vessel comprises two casings sealingly secured together by an annular weld.

4. Apparatus according to claim 3, wherein said plunger is secured to said weld.

5. Apparatus according to claim 1, wherein said pressure vessel comprises means to activate said temperature and pressure increasing means.

6. Apparatus according to claim 5, wherein said activating means comprise an igniter.

7. Apparatus for efficient utilization of a compressed gas supply comprising a sealed pressure vessel having a generally cylindrical chamber therein, a cup-shaped plunger made of a thermally conductive material contained within said chamber sealingly dividing said chamber into a first compartment and a second compartment, said plunger having a concave inner surface and a convex outer surface respectively defining said second and first compartments, the periphery of said plunger closely conforming to the shape of said chambers transverse cross section so that it is capable of axial sliding movement within said chamber, said concave and convex surface defining a wall thickness which is small compared to the diameter of said chamber so that a temperature increase in said second compartment will cause a transfer of heat to said first compartment, said plunger having an annular reduced section formed adjacent its periphery, said reduced section being adapted to fail upon the imposition of a predetermined stress, means to fixedly secure said plunger to said vessel, an annular solid fuel charge mounted within said second compartment, a working gas contained within said first compartment under a high pressure at least of the order of a 1,000 pounds per square inch, said first compartment having an outlet, means to seal said outlet to generally maintain said high pressure under static conditions, whereby ignition of said charge will increase the temperature and pressure in said second compartment causing failure of said reduced section, reduction of the residual volume of said second compartment, and heating of the working gas by compression and heat transfer across the wall of said plunger.

8. Apparatus for efficient utilization of a compressed gas supply comprising two casings, an annular weld sealingly securing said casings together, said casings forming a sealed pressure vessel having a cylindrical chamber therein, a thermally conductive plunger contained within said chamber and secured to said weld, said plunger sealingly dividing said chamber into a first compartment and a second compartment, said plunger being adapted for axial sliding movement in said chamber, means to prevent movement of said plunger within said chamber until a predetermined pressure differential between said first and second compartments is effected, a compressed working gas under high pressure contained within said first compartment, said first compartment having an outlet, means to seal said outlet to generally maintain said high pressure under static conditions, means to increase the temperature and pressure in said second compartment, said plunger having a wall thickness which is small compared to the diameter of said chamber so that a temperature increase in said second compartment will cause a transfer of heat to said first compartment, whereby a temperature and pressure increase in said second compartment will drive said plunger in said vessel reducing the residual volume of said second compartment and heat the working gas therein by heat transfer across said plunger.

9. Apparatus for efficient utilization of a compressed gas supply comprising a pressure vessel having a generally cylindrical chamber therein, a plunger made of a thermally conductive material contained within said chamber sealingly dividing said chamber into a first compartment and a second compartment, said plunger having a concave inner surface and a convex outer surface respectively defining said first and second compartments, the periphery of said plunger closely conforming to the shape of said chamber's transverse cross section so that it is capable of sliding movement within said chamber, a compressed working gas under high pressure contained within said first compartment, said first compartment having an outlet, means to seal said outlet to generally maintain said high pressure under static conditions, means, including a reduced section of said plunger and a seal weld connected to said plunger, to secure said plunger to said vessel and to prevent movement of said plunger in said chamber until a predetermined pressure differential between said compartments is established and means to increase the temperature and pressure in the second compartment.

10. Apparatus for efficient utilization of a compressed gas supply comprising two casings, an annular weld sealingly securing said casings together, said casings forming a pressure vessel having a generally cylindrical chamber therein, a plunger made of a thermally conductive material contained within said chamber and secured to said weld, said plunger sealingly dividing said chamber into a first compartment and a second compartment, said plunger having a concave inner surface and a convex outer surface respectively defining said first and second compartments, the periphery of said plunger closely conforming to the shape of said chamber's transverse cross section so that it is capable of sliding movement within said chamber, a compressed working gas under high pressure contained within said first compartment, said first compartment having an outlet, means to seal said outlet to generally maintain said high pressure under static conditions, means to secure said plunger to said vessel and to prevent movement of said plunger in said chamber until a predetermined pressure differential between said compartments is established and means to increase the temperature and pressure in the second compartment.

* * * * *